July 14, 1953  L. A. PAZANDAK  2,644,986
SEED DELINTER
Filed Sept. 3, 1948  2 Sheets-Sheet 1
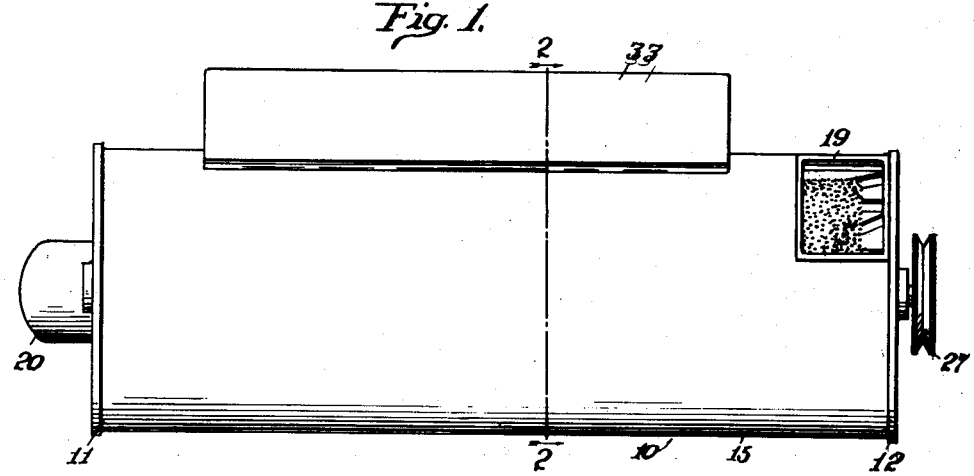
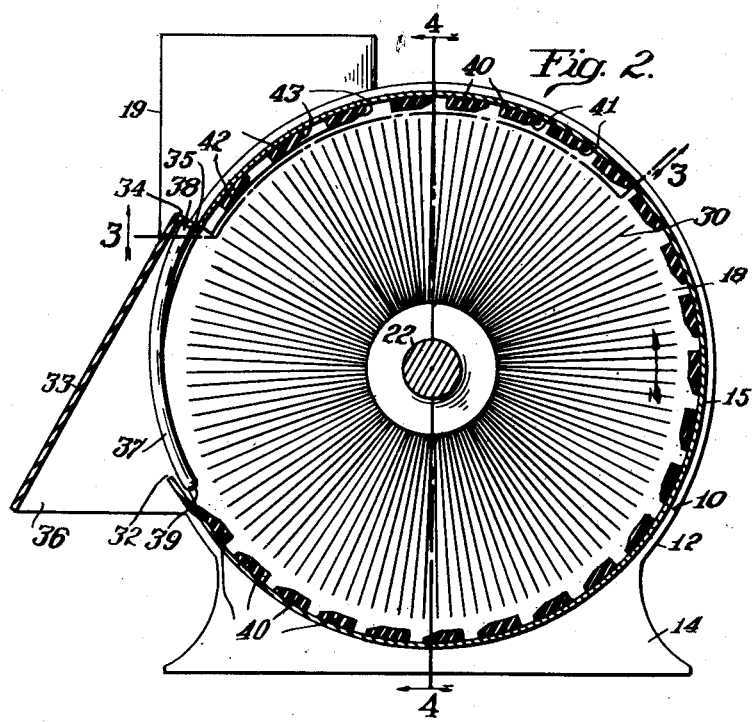
Inventor
Louis A. Pazandak
By Watson, Cole, Grindle & Watson
Attorneys

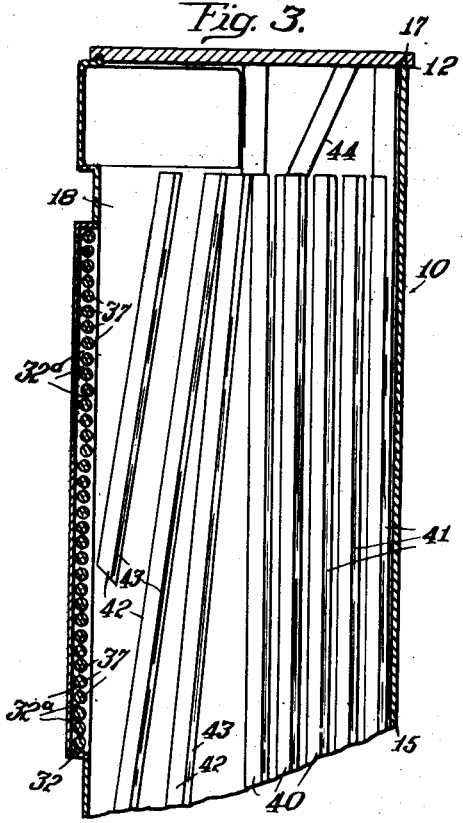
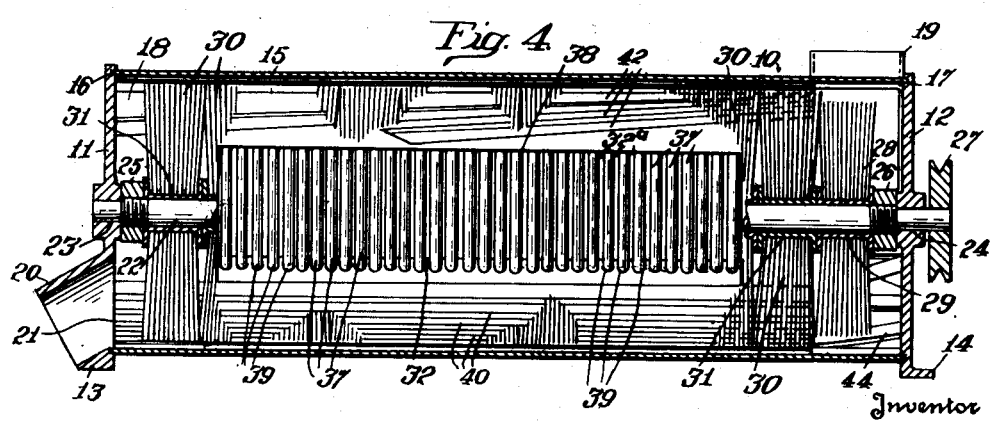

Patented July 14, 1953

2,644,986

UNITED STATES PATENT OFFICE 2,644,986

SEED DELINTER

Louis A. Pazandak, Minneapolis, Minn., assignor, by mesne assignments, to The Buckeye Cotton Oil Company, Cincinnati, Ohio, a corporation of Ohio Application September 3, 1948, Serial No. 47,694

19 Claims. (Cl. 19—44)

This invention relates to a machine and a process for ginning and for delinting cotton seeds, and has for its principal object the provision of a simple and efficient machine of the rotating brush type.

The brush type of ginning and delinting machines as heretofore constructed have not proved practical, typical shortcomings of these machines including one or more of the following, inefficient delinting performance, contaminated lint, excessive breakage of seed, incomplete separation of lint from delinted seed, inadequate control of the degree of delinting, tendency to clog, and mechanical defects and complexities.

The saw type of delinter causes chipping and scaling of small particles from the outer pigment layer of the seedcoat and even removes portions of the palisade cell layer. As a result the lint is unduly contaminated with "hull pepper."

These and other defects of prior delinting machines are minimized or eliminated in machines embodying the principles of the present invention.

Another object of the invention is to provide a machine for producing planting seed of improved quality, virtually free from lint and fuzz which interfere with accurate spacing of seed in machine planting, and also virtually free from defects in the seed coat which tend to impair uniform germination.

In general, my invention provides for and promotes repeated and controlled contact between linty cottonseed and the tips of durable bristles under conditions of relative movement sufficiently great to dislodge individual lint fibers from the seed coat when a bristle tip collides with a seed at or near a fiber root. I accomplish this by causing the seed to move in a generally spiral path within an annular delinting zone, on the inner portion of which are brush bristles traveling in a circular path at a high peripheral speed. The outer surface of the delinting zone, being yieldable, confines the rapidly moving seed (impelled outward by the blows of the moving bristles) within the delinting zone without breakage, and repeatedly and yieldably urges the seed into renewed contact with the moving bristle tips. The invention furthermore provides for the removal of the lint fibers thus dislodged from the seed in such a manner as to avoid entanglement or snarling of fibers, or their contamination with seed particles, or loss of lint. This is accomplished by the provision of a substantially non-clogging series of lint outlets so located with respect to the bristle tips as to permit the quick escape of the dislodged fibers through the outer wall of the annular space, while preventing escape of seed. The invention also provides for regulating the duration and extent of the delinting action of the bristles upon the average cottonseed subjected to the process, by limiting the approximate average number of spiral circuits traveled by seed while in the delinting zone.

The preferred machine of my invention comprises a cylindrical disposed brush having outwardly extending and durable yet flexible bristles, preferably of a springy nature, said brush being adapted to be rotated at a high speed within a cylindrical housing the interior surface of which is at least partially lined with a resilient material which most desirably has relatively high surface friction, such as rubber, the bristle tips of the rotating brush clearing the inner surface of the lining material by an amount sufficient for the passage of seed therebetween, means for continuously feeding linty seed into one end of the cylindrical housing, a delinted seed outlet at its other end, means for causing the seed to work their way (at a predetermined or adjustable rate) from the seed inlet to the seed outlet while subjecting them to vigorous delinting action as they are carried along in a generally spiral path in the annular space between the resilient lining and the bristle tips of the rotating brush, and means for removing the lint fibers thus dislodged from the housing through a series of non-clogging openings in its wall extending substantially the full length of the brush cylinder.

The following description of an exemplary model of a delinting machine incorporating the novel features of the invention will serve to impart a better understanding of the general nature of the machine and process defined in the accompanying claims. It is to be understood that this more detailed disclosure is merely illustrative, and is in no sense limiting, numerous changes in design and arrangement of parts being permissible within the scope of the invention.

In the accompanying drawings forming a part of this specification,

Fig. 1 is a top plan view of a cottonseed delinting machine in which the features and characteristics of the invention are incorporated;

Fig. 2 is an enlarged transverse sectional view of the machine of Fig. 1;

Fig. 3 is a fragmentary sectional view taken as on irregular line 3—3 in Fig. 2; and Fig. 4 is a longitudinal sectional view, parts being omitted, taken as on line 4—4 in Fig. 2.

The cottonseed delinting machine illustrated in the drawings comprises a casing 10 having a cylindrical wall 15 and end walls 11 and 12, secured thereto as indicated at 16 and 17, and having extensions 13 and 14 which serve as supports.

A hopper 19, at the upper side of the machine and at the end of the cylindrical wall 15 adjacent the end wall 12, leads to the interior 18 of the casing 10. A chute 20 leads downwardly and outwardly from an outlet 21 in a lower portion of the end wall 11.

A shaft 22, extending longitudinally of the cylindrical wall 15, is rotatably mounted, as indicated at 23 and 24, in the end walls 11 and 12, respectively.

Spaced apart nuts, designated 25 and 26, respectively, upon the shaft 22 are engaged against inner surfaces of the end walls 11 and 12 to preclude possibility of movement of said shaft in direction longitudinally of the casing 10. A portion of said shaft 22 extending outwardly of the end wall 12 fixedly supports a pulley 27 through the instrumentality of which the shaft may be rotated.

A portion of the longitudinally extending shaft 22 adjacent the nut 26 and the end wall 12 fixedly supports a feeding brush 28 of multiple disc construction which is situated within the casing 10 at location beneath the hopper 19. More explicitly, the disc shaped feeding brush 28 is made up of bristles arranged at right angle relation to the shaft 22 and fixed to a hub 29 which in turn is fixed upon said shaft 22. The bristles of said feeding brush 28 terminate at equal distance from the longitudinal axis of the shaft 22. In the disclosure as made, the hub 29 is in engaged relation with the nut 26.

These bristles, and also those of the delinting brushes 30, may be of any sufficiently durable yet flexible bristle material, such as steel wire, brass wire, or the like, preferably of springy nature. Wires having diameters ranging from about 8/1000 to about 40/1000 inch are suitable for the purpose (preferred diameters being about 12/1000 to 20/1000 inch), and bristle lengths of about one inch to about 3 inches or even more may advantageously be used.

As previously noted, the clearance between bristle tips and the interior surface of the housing lining is sufficient for the passage of seed therebetween. Owing to the flexibility of the bristles and the compressibility of the resilient lining, this clearance may be substantially less than the diameter of a seed on its shorter axis, which is about one-fourth inch. On the other hand, this clearance may be more than one seed diameter, although in general the delinting capacity of the machine decreases as the clearance increases above that corresponding to one seed diameter.

The whole of the length of said longitudinally extending shaft 22 between the hub 29 and the nut 25 fixedly supports delinting brushes 30 made up of radially extending bristles fixed to a hub 31, the bristle clusters of which may be arranged in disc construction, situated within said casing 10 and arranged in proximate relation to each other.

The expressions "feeding brush" and "delinting brush" are used more or less arbitrarily, the so-called feeding brush having a delinting function as well as a feeding function, and the so-called delinting brushes 30 having also a feeding function.

In an elongated rectilinear portion or opening 32 of cylindrical wall 15, extending longitudinally substantially the full length of the delinting brush cylinder, there are provided a series of closely spaced narrow lint outlet openings 32a, each of these openings extending some distance (usually several inches) in a circumferential direction, these narrow openings being interconnected at their trailing ends as will be made clear in what follows.

The narrow circumferentially directed lint outlet openings 32a are separated from one another over the greater part of their length by the spaced apart parallel fingers 37, each having its inner surface formed in the shape of an arc of substantially the same radius as that of the inner surface of cylindrical wall 15. The upper end, or leading end (i. e. the end first approached by a point on the revolving brush) of each arcuate finger 37 is secured, as at 38, to wall 15 adjacent the upper edge of the opening 32, as indicated in Fig. 2 and Fig. 3. Each arcuate finger extends in the direction of rotation of the brush and may extend slightly inwardly as shown, and the lower end, or trailing end, portion 39 of each arcuate finger 37 is unsecured and terminates substantially flush with the interior surface of the lining material of the housing and slightly out of contact with the housing wall at the lower edge of opening 32.

The construction and arrangement will be such that the spaced apart, parallel fingers 37 together with the elongated rectilinear opening portion 32 in the cylindrical wall 15 will constitute a substantially non-clogging screening instrumentality through which lint can pass but seed cannot. Such lint fibers or strands as may straddle one of the fingers 37 will be moved along towards and finally off of its trailing end by advancing seed impelled by the revolving brush, and/or by air currents generated by the brush, thus overcoming any tendency to clog the narrow lint discharge openings.

A hood 33 may be arranged to overhang this series of lint outlet openings so as to cause the escaping lint to collect and drop from the underside of this hood. An upper part of the hood 33 is integrally or rigidly secured, as at 34, to the cylindrical wall 15 along an upper side 35 of the rectilinear portion 32, and said hood 33 extends downwardly and outwardly from said upper side 35 and is open at its lower side 36. Instead of employing this hood, one may connect the series of lint outlet openings to the suction of a lint collecting system, preferably providing a mote (or trash) collecting zone adjacent and below the series of lint outlet openings in accordance with conventional lint cleaning practice.

Those portions of the interior surface of the cylindrical wall 15 which surround delinting brushes 30 fixedly support spaced apart, longitudinally disposed, parallel lining ribs or strips 40 which extend along said cylindrical wall 15 from about the location of the first of the brushes 30, adjacent to the feeding brush 28, to the end wall 11 having the outlet 21 and the chute 20. The feeding brush 28 and the delinting brushes 30, together with the shaft 22, are adapted to be rotated in the direction of the arrow, as shown in Fig. 2 of the drawings, and the leading or advance edge portion 41 of each of the strips 40 desirably is beveled as shown.

An upper portion of the interior surface of the cylindrical wall 15 adjacent the elongated rectilinear lint outlet portion 32 fixedly supports spaced apart, obliquely or angularly disposed lining strips 42 all of which extend along said cylindrical wall 15 from about the location of the first of the brushes 30, adjacent to the feeding brush 28, and some of which extend to the location of end wall 11. The strips 42 diverge slightly from one another and from the parallel strips 40, from a comparatively close spacing at the seed inlet end to a wider spacing at the seed outlet end of the cylinder, their direction of slant tending slightly towards the spiral direction of seed travel. The forward or advance edge portion 43 of each of said strips 42 is desirably beveled as shown. The strip 42 next adjacent to the spaced apart, parallel strips 40 diverges therefrom in direction toward the end wall 11.

A lower portion of the interior surface of the cylindrical wall 15, as well as a side portion thereof opposite the hopper 19 and an upper portion thereof adjacent to said hopper, fixedly supports spaced apart, parallel, angularly disposed feeding strips 44 which extend along said cylindrical wall 15 from the location of the end wall 12 to the locations of the adjacent ends of the spaced apart, parallel strips 40. The feeding strips 44 slant in the same direction with respect to the direction of rotation of the feeding brush 28 as do the strips 42 with respect to the direction of rotation of the feeding and delinting brushes 30.

The spaced apart, parallel, angularly disposed feeding strips 44 and the feeding brush 28 are adapted cooperatively to engage cotton seeds with cotton thereon placed in the hopper 19 and force them toward the spaced apart longitudinally extending, parallel lining strips 40. Adjacent said strips 40 the bristle tips of the delinting brushes 30 are adapted to engage the more or less linty cotton seed and cause lint or fuzz to be removed therefrom. The spaced apart, angularly disposed strips 42 and said delinting brushes 30 are adapted cooperatively to engage the cotton seed both to force them toward the end wall 11 and to cause lint or fuzz to be removed therefrom. It will be apparent that the construction and arrangement are such that linty cotton seed placed in said hopper 19 will be fed along the cylindrical wall 15, from right to left in Figs. 1 and 4 of the drawings, in a generally spiral path. All of the strips 40, 42 and 44 desirably can consist of rubber of either natural or synthetic origin, or other material having rubber-like compressibility and resiliency, and preferably having good abrasion resistance and a high rubber-like coefficient of friction.

As hereinbefore stated, the shaft 22 with the brushes 28 and 30 rotates in the direction indicated by the arrow in Fig. 2. Linty cotton seed, when dropped into the hopper 19, will be fed through cooperative action of the feeding brush 28 and the feeding strips 44 to adjacent end portions of the lining strips 40. Rotation of the delinting brushes 30 will cause each linty cotton seed to be moved transversely of the strips 40, first against the beveled edge portions 41, and then over the strips 40 and into contact with the bristles. In the course of each circuit around the interior of the cylinder, each cotton seed will be advanced to the position of the foremost angularly disposed strip 42, and continued rotation of said delinting brushes 30 will cause each seed to be moved transversely of, carried over and fed slightly along the strips 42 in direction toward the outlet 21. Each cotton seed again will be moved and carried across the series of strips 40 in a subsequent circuit of the cylinder upon being advanced beyond the series of strips 42. In operation, a continuous supply of seed is maintained in hopper 19, and the delinting process takes place continuously. As the cotton seeds are moved across the elongated rectilinear opening portion 32, cotton, lint, or fuzz removed from the cotton seeds is forced, by the combined action of centrifugal force and an air current generated by the rotating brush, to travel outwardly between (and/or past the free ends of) the spaced apart, parallel fingers 37 thus to become removed from the machine. As will be apparent, the cotton seeds, more or less free of lint, eventually will reach the location of the outlet 21 and pass from the machine by way of the chute 20. As the bristles of brushes 30, and the seed which they sweep along with them, pass the spaced apart, parallel fingers 37, which may appropriately have a diameter of about $\tfrac{3}{16}$ of an inch, any cotton, lint or fuzz which lodges upon or between any of said fingers 37 is wiped off of their free, lower end portions 39 by the motion of these seed.

The shaft 22 of the delinter is connected by suitable means, e. g. pulley 27 and a suitable belt, with a prime mover adapted to rotate the shaft at high speed. A speed of 900 to 1000 R. P. M. has been found quite effective with a brush cylinder 10½ inches in diameter, although these speeds are by no means limiting. A peripheral speed of at least about 2000 feed per minute is recommended, and a somewhat higher speed is preferred, with the delinter illustrated in the drawings. For modifications of this delinter employing other bristle spacings or other diameters or other clearances, speeds somewhat above or below this range may be found desirable.

In its operation my delinter serves to dislodge the lint fibers from the seed by the impact of the tips of the flexible bristles, under the existing conditions of rapid relative motion between seed and bristle tips. Whereas this rapid motion would be expected to result in significantly objectionable breakage of at least some of the somewhat fragile seeds, I substantially avoid this by my novel provision of yieldable means of restricting motion of the seed away from the bristles and of urging the seed again into contact with the bristles. This is accomplished by completely or partially lining the interior of cylindrical wall 15 with resilient material having effective surface frictional characteristics, such as rubber, whereby rapidly moving seeds are yieldably restrained without damage and are repeatedly urged back into contact with the bristle tips. Upon contact of one or a group of the rapidly rotating bristles against a seed, the seed moves tangentially and at high speed toward the housing wall. The spacing of the resilient lining strips, or of longitudinal ridges on the lining if it is continuous, is appropriately such that a seed moving tangentially from contact with the brush at a point opposite the crown of one lining strip or ridge will strike the base of the next strip or ridge, and will then be caused to move up and over this next strip or ridge into its next contact with the brush.

One convenient manner of providing a longitudinally ridged, yet effectively continuous lining is to line the interior of the brush housing with a series of partially overlapping strips of rubber or other suitable material, each strip extending substantially the length of the delinting zone and overlapping the adjacent strip for a fraction of an inch, with its exposed edge away from the direction of seed approach.

The character of the lint removal means of my cottonseed delinter is unique, and is of great importance in obtaining commercially desirable grades of lint of high quality. It facilitates the escape from the delinting zone of each individual lint fiber almost immediately after its dislodgement from the seed, and thus minimizes damage to the fiber, or tangling and snarling of groups of fibers such as tends to occur from prolonged presence of lint in the crowded and turbulent delinting zone. Furthermore it permits segregating the lint removed from the seed in the initial stages of the process (near the seed inlet end of the machine) from the lint removed in later stages, simply by subdividing the lint collecting zone or duct, outside the lint outlet portion 32 of the housing, into two or more zones each leading to a separate lint collecting station.

The seed delinting capacity of a given machine depends upon the average number of spiral circuits traveled by individual seeds in their path from seed inlet to seed outlet within the delinting zone. In general the capacity of machine, in weight of seed delinted per unit of time, is decreased by increasing the number of circuits traveled by a typical seed; and at the same time the yield of lint removed, per unit weight of seed subjected to treatment, tends to increase, within obvious limits. It is of considerable importance to design the machine so that the lint yield obtained will be as great or as little as desired, and so that the seed delinting capacity will be as high as is consistent with the desired lint yield. These yield and capacity requirements may be predetermined, and built into a given machine, or provision may be made for adjusting these factors (actually by suitably varying the total number of circuits traveled by the average seed) after the machine is assembled, and even while it is in operation if desired. Two principal variables may be utilized in the machine of this invention for controlling the seed throughput rate, and inversely the lint yield, the first being the degree of slant of one or more of the lining strips or ridges on the lining, and the second being the slope of the axis of the machine.

The machine specifically illustrated herein is mounted horizontally, and the seed throughput rate under a given set of operating conditions depends upon the number of obliquely disposed lining strips 42 and the degree of slant of each of these. The same throughput rate may alternatively be obtained by slanting all of the lining strips a very slight amount, less than the slant shown for strips 42. Alternatively, all but one or all but a very few of the lining strips may be mounted parallel to the axis of the cylinder, and one or two of the strips (preferably next adjacent the edge 38, Fig. 2, of the lint outlet) may be subdivided into a series of separate short strips, each mounted to the housing by means of a bolt and lock nut in a manner permitting easy adjustment of its direction of slant. Such an arrangement permits one to adjust the rate of longitudinal advance of the seed differently in different portions of the machine, which is helpful in adjusting the delinting load so that it will be uniformly distributed over the length of the brush.

Instead of relying on directional lining strips for determining and regulating throughput rate and lint yield, one may utilize the force of gravity as the principal means, or as an auxiliary means, for controlling these end results. Thus the axis of the machine may be disposed vertically, with the seed taking a downward path (retarded, if desired, by directional lining strips slanted away from the spiral direction of seed travel), or on a downward slope. The axis may even be disposed on an upward slope if suitable directional lining strips are provided so as to advance the seed towards the seed outlet.

In addition to directional lining strips and the slope of the axis of the machine, a number of other factors influence the seed throughput rate and the comparative lint yield, including clearance between brush and housing, rotational speed of brush, character and spacing of bristles, and nature of the lining surface. In this last named connection, it is noteworthy that one advantage of a lining made of rubber is that its frictional characteristics have a desirable restraining effect upon what otherwise might be a tendency of the seed to move so fast circumferentially within the delinting zone that the impact of the moving bristles would be ineffective for dislodging lint from the seed coat.

While I have specifically described a modification of my invention which includes a horizontal and truly cylindrical brush and housing, mounted coaxially, and other specific details of design, it is understood that other arrangements and other features which are of record in the art of delinting cotton seed by brush action, or which are obvious to skilled cottonseed millers, may advantageously be employed in conjunction with the improvements herein described and claimed. Thus if one chooses to employ a vertical arrangement of brush and housing, as proposed in McCormick Patent 1,020,108, it is obvious that this will permit one to feed the seed into the upper end of the annular space, formed between the brush and the housing, over the full 360° of this annulus, thus favoring uniformity of seed distribution in the delinting zone. Then too, one may employ a brush and housing which are slightly tapered, instead of being truly cylindrical, as proposed by Collyer in Patent 408,085 and by Hawk in Patent 1,041,463, this being an arrangement which readily permits varying the clearance between bristle tips and the inner surface or surfaces of the lining material by adjusting the longitudinal position of the brush within the housing. Such adjustment may be made to compensate for wear of bristles, and also as an independent control of throughput rate and lint yield. Similarly, the brush construction may be varied, for example to provide considerable distances between adjacent rows of bristles as illustrated in de Massas Patent 52,116.

In the following claims the terms "lint" and "linters" are used in the broad sense, to refer generally to the cellulosic fibers found on unginned cottonseed as well as the comparatively short residual fibers left on the seed following the conventional ginning operation.

Having thus described my invention, what I claim and desire to secure by Letters Patent is:

1. A cottonseed delinting machine comprising a substantially cylindrical casing, said casing being at least partially lined with a rubbery, non-metallic, resilient, friction exerting material having a compressibility and elasticity sufficient to prevent seed breakage and to urge the seed repeatedly back into contact with the moving bristle tips, a brush supported for rotation within and on an axis extending lengthwise of said casing, said brush having bristles of a length such as to provide an annular passage between the bristle tips and the casing, means for rotating said brush at a high peripheral speed, said casing having a linty seed inlet at one end and a delinted seed outlet at the other end, and a series of narrow non-clogging lint discharge openings in the cylindrical wall, said series extending substantially the full length of said cylindrically disposed brush.

2. A cottonseed delinting machine comprising a substantially cylindrical casing, a brush supported for rotation within and on an axis extending lengthwise of said casing, said brush having bristles of a length such as to provide an annular passage between the bristle tips and the casing, means for causing said brush to rotate at a high peripheral speed, said casing being at least partially lined with a rubbery, non-metallic, resilient friction exerting material having a compressibility and elasticity sufficient to prevent seed breakage and to urge the seed repeatedly back into contact with the moving bristle tips and having a linty seed inlet at one end and a delinted seed outlet at the other end, means carried by said casing and extending into said annular passage for causing the seed to follow a generally spiral path within said passage under the action of said brush from seed inlet to seed outlet, and a series of narrow lint discharge openings in the cylindrical wall, said series extending substantially the full length of said cylindrically disposed brush.

3. A cottonseed delinting machine comprising a cylindrical casing, a brush supported for rotation within and substantially on the axis of said casing, said brush having bristles of a length such as to provide an annular passage between the bristle tips and the casing, means for causing said brush to rotate at a high peripheral speed, said casing having a linty seed inlet at one end and a delinted seed outlet at the other end, and a series of narrow transverse lint discharge slits in the cylindrical wall, adjacent slits being interconnected at their trailing ends and being separated by circumferentially directed fingers fixed to the cylindrical wall at their leading ends only, said series of slits extending substantially the full length of said cylindrically disposed brush.

4. A cottonseed delinting machine comprising a cylindrical casing, said casing being at least partially lined with rubber, a brush supported for rotation within and on an axis extending lengthwise of said casing, said brush having bristles of a length such as to provide an annular passage between the bristle tips and the casing, means for causing said brush to rotate at a high peripheral speed, said casing having a linty seed inlet at one end and a delinted seed outlet at the other end, said rubber lining being formed to provide ridges disposed generally lengthwise of said casing and extending into said annular passage for causing the seed to follow a generally spiral path within said passage under the action of said brush from seed inlet to seed outlet, and a series of narrow lint discharge openings in the cylindrical wall, said series extending substantially the full length of said cylindrically disposed brush.

5. A cottonseed delinting machine comprising a cylindrical casing, a brush supported for rotation within and on an axis extending lengthwise of said casing, said brush having bristles of a length such as to provide an annular passage between the bristle tips and the casing, means for causing said brush to rotate at a high peripheral speed, said casing having a linty seed inlet at one end and a delinted seed outlet at the other end, elongated ribs of deformable elastic material mounted on the interior of said casing and extending into said annular passage, said ribs extending generally lengthwise of said casing and being inclined, as they approach the seed outlet end, slightly in the direction of brush rotation, whereby the seed is caused to follow a generally spiral path within said passage under the action of said brush from seed inlet to seed outlet, and a series of narrow transverse lint discharge openings in the cylindrical wall, said series extending substantially the full length of said cylindrically disposed brush.

6. A cottonseed delinting machine comprising a cylindrical casing at least partially lined with rubber, a brush supported for rotation within and on an axis extending lengthwise of said casing, said brush having bristles of a length such as to provide an annular passage between the bristle tips and the casing, means for causing said brush to rotate at a high peripheral speed, said casing having a linty seed inlet at one end and a delinted seed outlet at the other end, said casing having an elongated lint discharge opening intermediate said seed inlet and seed outlet, and a plurality of generally circumferentially extending fingers fixed to said casing at their leading ends only and extending substantially across said opening, said fingers being spaced axially of said casing to provide a series of lint discharge slits of less width than a cottonseed.

7. A cottonseed delinting machine comprising a cylindrical casing, a brush supported for rotation within and substantially on the axis of said casing, said brush having bristles of a length such as to provide an annular passage between the bristle tips and the casing, means for causing said brush to rotate at a high peripheral speed, said casing having a linty seed inlet at one end and a delinted seed outlet at the other end, said casing having an elongated lint discharge opening intermediate said seed inlet and seed outlet, and a series of generally circumferentially extending, resilient fingers fixed to said casing at their leading ends only and extending substantially across said opening, said fingers being free at their trailing ends and being spaced axially of said casing to provide a series of lint discharge slits of less width than a cottonseed, said discharge opening and fingers extending substantially the entire length of said brush.

8. A cottonseed delinting machine comprising a cylindrical casing, a brush supported for rotation within and substantially on the axis of said casing, said brush having bristles of a length such as to provide an annular passage between the bristle tips and the casing, means for rotating said brush at a high peripheral speed, said casing having a linty seed inlet at one end and a delinted seed outlet at the other end, said casing having an interior lining of rubber having ribs formed thereon, said ribs being so directed as to cause the seed to move longitudinally of the casing within said annular passage from seed inlet to seed outlet while partaking of rotational movement imparted by the brush, said casing having an elongated lint discharge opening intermediate said seed inlet and seed outlet, and a plurality of generally circumferentially extending fingers fixed to said casing at their leading ends only and extending across said opening, said fingers being spaced axially of said casing to provide a series of lint discharge slits of less width than a cotton seed.

9. A cottonseed delinting machine comprising a substantially cylindrical casing, a brush supported for rotation within and on an axis extending lengthwise of said casing, said brush having bristles of a length such as to provide an annular passage between the bristle tips and the casing, means for causing said brush to rotate at a high peripheral speed, said casing being at least partially lined with a rubbery, non-metallic, resilient friction exerting material having a compressibility and elasticity sufficient to prevent seed breakage and to urge the seed repeatedly back into contact with the moving bristle tips and having a linty seed inlet at one end and a delinted seed outlet at the other end, means carried by said casing and extending into said annular passage for causing the seed to follow a generally spiral path within said passage under the action of said brush from seed inlet to seed outlet, and a lint discharge opening in the cylindrical wall extending substantially the full length of said cylindrically disposed brush.

10. A cottonseed delinting machine comprising a cylindrical casing, a brush supported for rotation within and on an axis extending lengthwise of said casing, said brush having bristles of a length such as to provide an annular passage between the bristle tips and the casing, means for causing said brush to rotate at a high peripheral speed, said casing having a linty seed inlet at one end and a delinted seed outlet at the other end, elongated ribs of deformable elastic material mounted on the interior of said casing and extending into said annular passage, said ribs extending generally lengthwise of said casing and being inclined, as they approach the seed outlet end, slightly in the direction of brush rotation, whereby the seed is caused to follow a generally spiral path within said passage under the action of said brush from seed inlet to seed outlet, said casing having an elongated lint discharge opening intermediate said seed inlet and seed outlet, and a plurality of generally circumferentially extending fingers fixed to said casing at their leading ends only and extending substantially across said opening, said fingers being spaced axially of said casing to provide a series of lint discharge slits of less width than a cotton seed.

11. A cotton seed delinting machine comprising a cylindrical casing, a brush supported for rotation within and substantially on the axis of said casing, said brush having bristles of a length such as to provide an annular passage between the bristle tips and the casing, means for causing said brush to rotate at a high peripheral speed, said casing being at least partially lined with a rubbery, non-metallic, resilient friction exerting material having a compressibility and elasticity sufficient to prevent seed breakage and to urge the seed repeatedly back into contact with the moving bristle tips and having a linty seed inlet at one end and a delinted seed outlet at the other end, and a non-clogging lint discharge opening in the cylindrical wall extending substantially the full length of said cylindrically disposed brush.

12. The machine of claim 3, wherein the trailing ends of said fingers are no further from the axis of the machine than is the inner surface of the lining of the casing.

13. The machine of claim 11, wherein the resilient lining comprises spaced apart longitudinally disposed strips of rubber-like material.

14. The machine of claim 13, wherein the leading edges of said strips are beveled.

15. The machine of claim 13, wherein the major portion of the lining strips are parallel to the horizontal axis of the machine, and the remainder of the lining strips are slightly inclined in the direction of brush rotation and seed travel.

16. The machine of claim 1, in which the brush is made of springy wire bristles from about 8 to about 40 thousandths inch in diameter and about 1 to 3 inches long.

17. The machine of claim 1, in which the brush rotating means turns the brush at a peripheral speed of at least 2000 feet per minute.

18. A machine for delinting cotton seeds and for separating the cotton seeds from lint removed therefrom, comprising a casing consisting of a longitudinally extending hollow cylindrical wall, mounted in a substantially horizontal position, and end members closing the opposite ends thereof, a shaft extending longitudinally of said cylindrical wall and rotatably mounted in said end members in spaced relation to the cylindrical wall, a linty cottonseed feed inlet at one end of said casing, an outlet for delinted cottonseeds leading from said casing at the other end thereof, delinting brushes fixed upon said shaft between said inlet and said outlet, said cylindrical wall having an elongated opening intermediate said inlet and outlet, parallel, longitudinally spaced, circumferentially directed fingers fixed to the cylindrical wall at their leading ends only and extending substantially across said opening to provide a series of lint discharge slits, said slits being narrower than a cottonseed, and a plurality of resilient lining strips upon the interior surface of the cylindrical wall extending along said cylindrical wall the length of said delinting brushes.

19. The machine of claim 2, wherein the lining is rubber.

LOUIS A. PAZANDAK.

References Cited in the file of this patent

UNITED STATES PATENTS

| Number | Name | Date |
|---|---|---|
| 499,873 | Cross | June 20, 1893 |
| 1,131,545 | Pasley | Mar. 9, 1915 |
| 1,457,329 | Voorhies | June 5, 1923 |

FOREIGN PATENTS

| Number | Country | Date |
|---|---|---|
| 6,154 | Great Britain | of 1890 |
| 10,014 | Great Britain | of 1895 |
| 12,177 | Great Britain | of 1890 |